UNITED STATES PATENT OFFICE 2,400,048

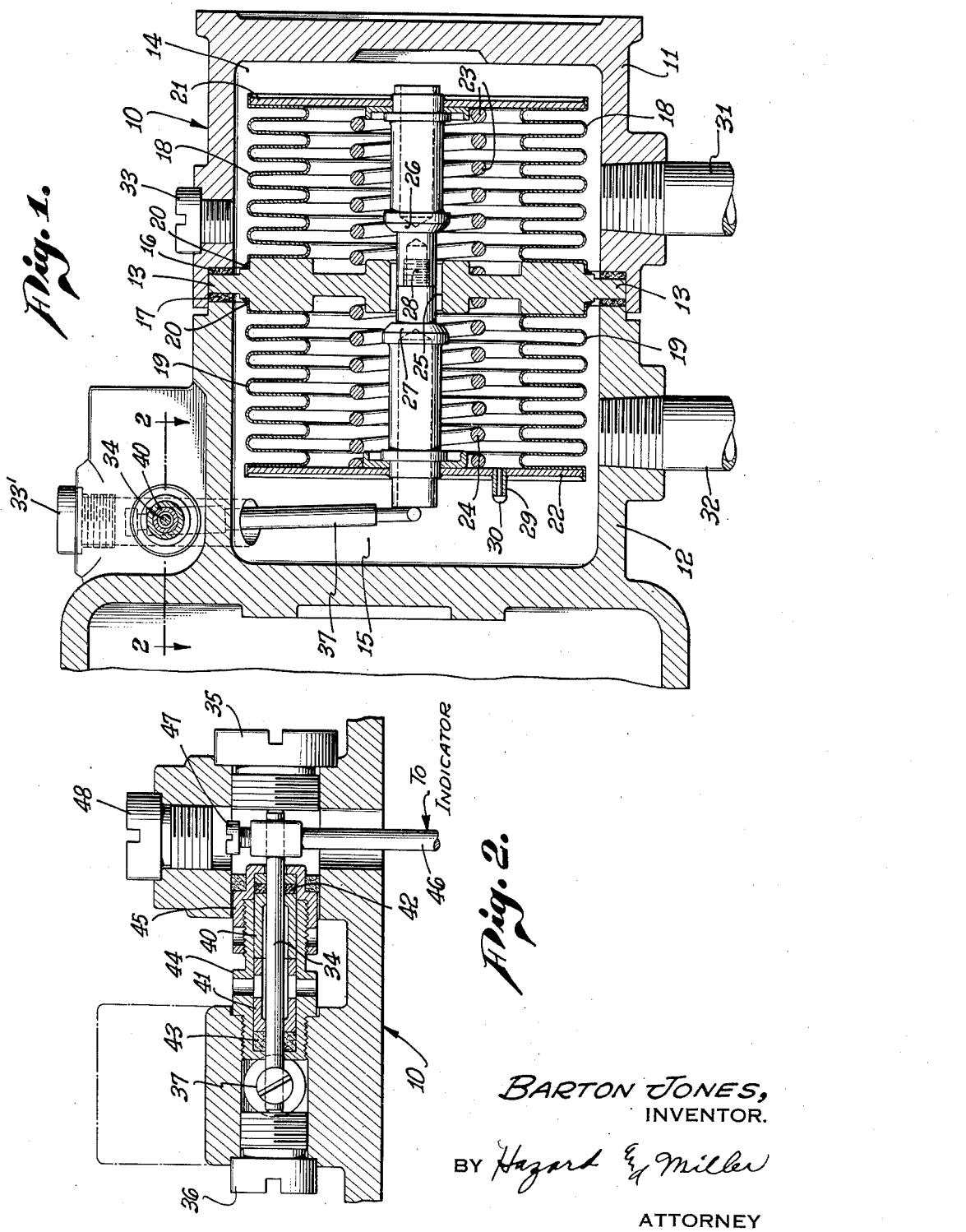

DIFFERENTIAL PRESSURE RESPONSIVE DEVICE

Barton Jones, Los Angeles, Calif.

Application June 11, 1943, Serial No. 490,423

5 Claims. (Cl. 137—156.5)

This invention relates to a differential pressure responsive device responsive for use in measuring or controlling pressure differentials.

When metering flowing fluids by means of a primary device, such as for example an orifice, Venturi tube, or pitot tube, an instrument is required to measure the differential pressures created by such devices. Similar instruments are also utilized to indicate, record, or control liquid levels and to gauge the difference between two fluid pressures.

One commonly-employed method to determine differential pressures is to balance out the differential pressure with a liquid column of known density, such as for example a column of water or mercury. Readings are obtained by noting the height of the liquid column directly such as in a U-tube manometer. Manometer readings are also sometimes obtained indirectly through mechanical or electrical devices. Principal objections to the use of a manometer are bulk and the danger of blowing the manometer liquid out of the instrument if it is subjected to excessive differential pressures. Another objection is that the manometer liquid is subject to becoming contaminated with foreign matter which causes inaccurate readings to be obtained.

Another method employed to determine differential pressures is to balance out the differential by means of a spring or weight-loaded diaphragm or bellows and to transmit the motion of the diaphragm or bellows mechanically or electrically to an indicating device, such as an indicating pointer or recording pen. However, since the diaphragm or bellows must be relatively sensitive in order to respond to low magnitudes of differential pressure commonly encountered, the diaphragm or bellows is subject to rupture or distortion if subjected accidentally to a much greater differential pressure than for which it was designed.

Still another method of determining differential pressures has been to employ two opposed diaphragms or bellows that are mechanically connected. These constructions have inherent weaknesses due to the fact that both diaphragms or bellows as the case may be must be of exactly the same effective area and must be strong enough to withstand the entire pressure acting upon them. For this reason there must be a sacrifice of sensitivity which is required to measure differentials of low magnitude.

A primary object of the present invention is to provide a device which is responsive to the differential between two pressures, such as for example the differential between the pressures upstream and the downstream with respect to an orifice plate, nozzle, or Venturi tube which device is so constructed that if either pressure is conducted to the device alone without the other pressure acting in opposition thereto, that the device will be adequately protected against destruction or permanent distortion, which would prevent an accurate reading being obtained on an indicating device when normal operating conditions were resumed.

Another object of the invention is to provide a device which is responsive to the differential between two pressures which is so constructed that it will resist destruction or permanent distortion even under the most abusive conditions but which is highly sensitive to differentials in pressure which may be of very small magnitude. In other words, by means of the present device sensitivity is not sacrificed in order to insure against destruction and permanent distortion under extreme conditions.

Another object of the invention is to provide a device having the above-mentioned characteristics wherein only relatively few of the functional parts are in direct contact with the pressure medium and such of those as are in direct contact are in a position to be readily cleaned.

Another object of the invention is to provide a device responsive to pressure differentials which is so designed that the liquid therein can be drained therefrom and refilled without the retention of air pockets which might contribute to inaccurate readings.

With the foregoing and other objects in view, which will be made manifest in the following detailed description and specifically pointed out in the appended claims, reference is had to the accompanying drawing for an illustrative embodiment of the invention, wherein:

Figure 1 is a longitudinal section through the device for measuring pressure differentials embodying the present invention; and Fig. 2 is a sectional view taken substantially upon the line 2—2 in the direction indicated.

Referring to the accompanying drawing wherein similar reference characters designate similar parts throughout, the device for measuring pressure differentials embodying the present invention in its preferred form comprises a housing generally designated at 10 preferably formed of two opposed parts 11 and 12 detachably connected together such as by bolts and companion flanges (not shown). Within this housing there is a chamber that may be regarded as divided by a partition 13 into two compartments 14 and 15. The edge of the partition is interposed between gaskets 16 and 17 which are between the opposed faces of the parts 11 and 12 of the housing 10. Within the chamber of the housing there are two metallic bellows 18 and 19 the walls of which are corrugated and which are formed of very thin flexible metal. The inner or adjacent ends of these bellows are permanently secured, such as by sweating indicated at 20, to the opposite sides of the partition 13. The outer or floating ends of the bellows are similarly secured to outer plates 21 and 22, respectively. Coil springs 23 and 24 are seated on opposed sides of the partition 13 and bear against the inner faces of the plates 21 and 22. In the center of the partition 13 there is formed a passage 25 which establishes communication through the partition from one bellows to the other. At opposite ends of this passage there are formed seats for valves 26 and 27, the stems of which are connected together through the passage 25 such as by the threaded connection 28. The outer ends of the stems for the valves may be drilled out for lightness purposes, and are connected to the plates 21 and 22. Preferably the seating surfaces of the valves 26 and 27 are spherically shaped and the seating surfaces at the ends of the passage 25 are beveled so that whenever these valves have occasion to seat on the partition 13 they may accommodate themselves to the seats to prevent leakage through the passage 25.

The connections between the bellows and their respective plates 21 and 22 and the partition 13 and the connections between the stems of the valves and the plates 21 and 22 are hermetically sealed such as by sweating. In the plate 22 there is provided an exhausting and filling nipple 29. This nipple is employed for the purpose of exhausting all air from the interior of the bellows and for then refilling the bellows with an incompressible liquid, such as for example kerosene. I find that for proper operation of the device all air should be withdrawn from the bellows prior to the introduction of the liquid and to this end the nipple 29 is first connected by a vacuum pump and a high degree of vacuum created within the bellows. Then the liquid is introduced into the bellows and fills the entire interior space thereof. If the air is not first exhausted, such as by a vacuum pump, there is danger of small bubbles remaining in the liquid due to the corrugated nature of the container formed by the bellows and the presence of such bubbles is objectionable. When the interior of the bellows is thus completely filled with liquid the nipple 29 is sealed such seal being indicated at 30.

31 and 32 indicate tubing or other conduits that conduct pressure from two pressure sources to the compartments 14 and 15. These pressure sources may arise from any one of a number of different conditions, such as for example, upstream and downstream pressures on opposite sides of an orifice, nozzle, or a venturi. In some instances the pressure sources may be from different localities in a tank or pressure-retaining vessel. In other instances, the pressure sources may arise in separate tanks entirely. No attempt is made herein to enumerate all of the variety of circumstances under which it may be desirable to ascertain the difference between two pressures or to utilize the difference between two pressures for control purposes. Normally conduit 31 conducts the higher pressure to the device and conduit 32 conducts the lower or downstream pressure. Plug 33 is removable and is located at the top of a housing 10 for venting compartment 14. Compartment 15 may be vented by removing plug 33'. In this way any air pockets within the compartments are afforded an opportunity to escape if the compartments are filled with liquid so that the air pockets will not tend to affect the accuracy of the device.

On one side of the housing there is provided a pressure bearing for a rocker shaft 34. This rocker shaft has its ends disposed against adjustable plugs 35 and 36 which function as thrust bearings therefor. On one end of this rocker shaft there is a lever arm 37 engageable with the end of the stem of valve 27. The pressure bearing illustrated consists of two sleeves 40 and 41 disposed about the rocker shaft against which is positioned packing 42 and 43. Packing 43 can be compressed about the rocker shaft 34 by tightening nut 45. The other end of the rocker shaft may be connected to any suitable mechanism such as by an arm 46 mounted for rotational adjustment on the rocker shaft such as by a set screw 47 which is accessible through a cap screw 48. Arm 46 may be connected to an indicating mechanism, not shown, or to a control mechanism. The particular mechanism that is influenced or affected by the present device may vary greatly and the connection between arm or crank 46 and the indicator or control mechanism may vary greatly.

The operation and advantages of the construction as above-described are as follows: Assuming in a typical illustration that tubing 31 conducts high pressure, such as upstream pressure, of 500 pounds per square inch to compartment 14 and that tubing 32 conducts lower or downstream pressure of 499 pounds per square inch to compartment 15, both of these pressures will be effected on the exteriors of the bellows 18 and 19. Although the walls of these bellows are quite thin, being normally approximately .005" in thickness, these high static pressures do not permanently deform the bellows. The thin walls of the bellows serve merely to transmit the pressure to the incompressible liquid confined therein.

Communication is normally available between the interior of bellows 18 and the interior of bellows 19 through passage 25 which is normally open. However, as the pressure on the exterior of bellows 18 is one pound greater, in the illustration given, than the pressure on the exterior of bellows 19, this differential in pressure effects a movement of the connected outer or floating ends of the two opposed bellows until the differential is balanced out by the spring effect of the bellows themselves and of the coil springs within the bellows. The movements of the bellows are transmitted by the lever arm or crank 37 to rocker shaft 34 and thence through crank 46 to the indicator or control mechanism as the case may be. In this manner, small differential pressures are accurately determined or utilized.

Assuming now a highly abnormal condition wherein a pressure of 500 pounds is supplied through conduit 31 to compartment 14, but no pressure is supplied to compartment 15 through conduit 32. Such abnormal conditions may arise from a variety of circumstances. Under these conditions the high static pressure which is effective upon bellows 18 will not rupture or produce permanent deformation of either bellows. Such high pressure on the exterior of bellows 18 would tend to collapse bellows 18 and to expand bellows 19. However, before either bellows would be acted upon to such an extent as to produce rupture or permanent distortion, valve 26 seats upon its seat to close passage 25 and thus stop communication between the bellows through partition 13. The incompressible liquid which is thus entrapped in bellows 18 resists its collapse, rupture, or permanent distortion despite the fact that the bellows walls may be extremely thin. Consequently, whenever normal conditions are resumed wherein the difference in pressures in conduits 31 and 32 is relatively small, the device resumes normal operation and functions accurately. There is consequently no necessity of recalibrating the indicator or making any other adjustment of a control mechanism that may be operated by the device. It will, of course, be understood that if high static pressure is supplied to compartment 15 with little or no pressure conducted to compartment 14, that destruction or permanent distortion of the device is prevented in a similar manner.

Under these circumstances, valve 27 seats on its seat in passage 25 thus entrapping the incompressible liquid in bellows 19 which resist collapse or permanent deformation of bellows 19 regardless of how high the static pressure in compartment 15 may be.

Inasmuch as the bellows, their end plates, and the partition 13 cooperate to form a hermetically sealed container which is initially filled with a clean, incompressible liquid, such as kerosene, there is no opportunity for the valves 26, 27, or their seats to become dirty or corroded.

The construction above-described is advantageous in other respects. It is unnecessary to have the effective area of the two bellows 18 and 19 exactly the same. Considerable tolerance in this respect is permissible due to the fact that in normal operating conditions the bellows are in communication with each other through passage 25 and consequently, pressures on the interiors of the two bellows are equalized. Temperature variations likewise have a neutralizing effect inasmuch as during normal operations both bellows are in constant communication.

It not infrequently occurs that the fluid whose pressure is being measured by the differential pressures is dirty and the dirt works its way into the compartments 14 and 15. If such occurs, it is an easy matter to remove the operating mechanism of the device for purposes of inspection and cleaning. This is accomplished by merely detaching the companion flanges (not shown) that are on the opposed parts 11 and 12 of the housing. The bellows and end plates, and the partition may then be removed as a complete unit and inspected. Whatever dirt may have accumulated between the corrugations on the exterior of the bellows can be readily wiped off. When the unit is replaced it will be noted that it reassumes its position in engagement with the lever arm 37 and consequently no readjustment or recalibration of any kind is required.

If, for any reason, the unit should be replaced this may be also readily accomplished by merely separating the parts 10 and 11, removing the defective unit and replacing it with a new one. This ordinarily requires no readjustment or recalibration of parts.

Any means may be utilized for transmitting or translating movements of the bellows to an indicating mechanism or control mechanism. While I have illustrated a mechanical connection to such a device as consisting of the lever or crank 37 and associated structure, it will be understood by those skilled in the art that a hydraulic connection or even an electrical mechanism could be employed for advantageously utilizing the movements of the bellows which are brought about or are caused by the difference between the two pressures supplied to the device.

From the above-described construction it will be appreciated that the device embodying the present invention is so designed that its parts may be readily constructed and assembled together, that in such construction considerable tolerance is permissible. Furthermore, the device is self-protected at all times against destruction or permanent deformation, even in the event that high pressure is supplied to one compartment 14 or 15 only. If cleaning, inspection, or replacement are required at any time, this may be accomplished with a minimum of labor and time, and in so doing, it is ordinarily unnecessary to make any readjustment or recalibration.

Various changes may be made in the details of construction without departing from the spirit or scope of the invention as defined by the appended claims.

I claim:

1. A device of the class described comprising means providing two chambers to which different fluid pressures may be supplied, a bellows in each chamber externally subjected to the pressures therein respectively, said bellows having their adjacent ends anchored and their remote ends movable, said bellows being filled with a liquid and being in communication with each other for flow of liquid from one bellows to the other, means rigidly connecting the remote ends of the bellows to cause them to move in unison in response to differential between the pressures in their respective chambers, and means responsive to excessive pressure differentials for sealing off communication between the interiors of the bellows against flow of liquid therebetween.

2. A device of the class described comprising means providing two chambers to which different fluid pressures may be supplied, a bellows in each chamber externally subjected to the pressures therein respectively, said bellows having their adjacent ends anchored and their remote ends movable, said bellows being filled with a liquid and being in communication with each other for flow of liquid from one bellows to the other, means rigidly connecting the remote ends of the bellows to cause them to move in unison in response to differential between the pressures in their respective chambers, and means on said connecting means for sealing off communication between the bellows against flow of liquid therebetween when the differential or pressures to which they are subjected become excessive.

3. A device of the class described comprising means providing two chambers separated from each other by a partition, a bellows in each chamber externally subjected to the pressure therein, said bellows having their adjacent ends anchored on opposite sides of the partition, the bellows being filled with liquid and being in communication with each other through the partition for flow of liquid from one bellows to the other, means rigidly connecting the movable ends of the bellows together to cause them to move in unison, and means movable by the movable ends of the bellows for sealing off communication between the bellows through the partition against flow of liquid therethrough when the differential in pressure to which the bellows are subjected becomes excessive.

4. A device of the class described comprising means providing two chambers separated from each other by a partition, a bellows in each chamber externally subjected to the pressures therein, said bellows having their adjacent ends anchored on opposite sides of the partition, the bellows being filled with a liquid and being in communication with each other through an aperture in the partition, means rigidly connecting the movable ends of the bellows to each other through the aperture in the partition to cause them to move in unison, and valve means on said means adapted to seat on seats on said partition to close said aperture when the differential pressures to which the bellows are subjected become excessive.

5. In a differential pressure responsive device a construction which comprises: chamber means, a partition dividing said chamber means into two separate pressure chambers, a bellows member in each of said chambers adapted to be subjected externally to the pressure therein, each of said bellows members having one end mounted on said partition and sealed thereto in a fluid tight attachment and the other end directed away from said partition and adapted for movement toward and away from said partition in response to pressure conditions within said pressure chamber, means defining a fluid passage in said partition establishing fluid communication between the interiors of said bellows members, said bellows members being filled with liquid, means rigidly connecting said other ends of said bellows members together to cause them to move in unison, a valve seat on said partition in said fluid passage, and valve means rigid with and movable with said connecting means adapted to seat upon said valve seat for closing said fluid passage and providing a liquid tight seal closing off communication between said bellows members when said connecting means is urged to move beyond a predetermined position.

BARTON JONES.